No. 742,121. Patented October 20, 1903.

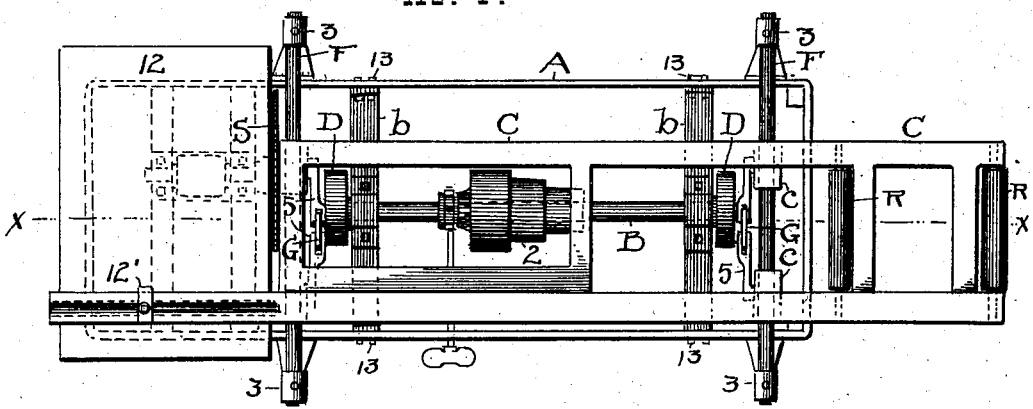

UNITED STATES PATENT OFFICE.

GEORGE KUNDMUELLER, OF CLEVELAND, OHIO, ASSIGNOR OF ONE-HALF TO JOHN N. HAHN, OF CLEVELAND, OHIO.

SAWING-MACHINE.

SPECIFICATION forming part of Letters Patent No. 742,121, dated October 20, 1903.

Application filed April 18, 1903. Serial No. 153,280. (No model.)

*To all whom it may concern:*

Be it known that I, GEORGE KUNDMUELLER, a citizen of the United States, residing at Cleveland, in the county of Cuyahoga and State of Ohio, have invented certain new and useful Improvements in Sawing-Machines; and I do declare that the following is a full, clear, and exact description of the invention, which will enable others skilled in the art to which it appertains to make and use the same.

My invention relates to sawing-machines; and the object of the invention is to provide a machine which is adapted to saw boards and other wood stuff into given lengths according to gage and in which there is a carrier for the stuff adapted to travel back and forth transversely across the machine, all substantially as shown and described, and particularly pointed out in the claims.

In the accompanying drawings, Figure 1 is a plan view of the machine. Fig. 2 is a longitudinal sectional elevation thereof on line $xx$, Fig. 1; and Fig. 3 is a cross-section of the machine on a line corresponding to $zz$, Fig. 2. Fig. 4 is a view of a detail, as hereinafter described.

The machine thus shown is adapted to be used in box and crate factories, especially where boards and wooden strips or pieces are to be cut into exactly equal and uniform lengths and in which the lengths are to be varied according to the size of box or crate to be built.
The present construction is such that an attendant has simply to feed the board or other stuff forward each time to the gage, and the automatic operation of the carrier will carry the wood across cutting position by the saw and back again at such rate of speed as will greatly facilitate the work and at the same time produce accurate work according to the gage or measurement at which the machine is set.

Now, referring to the drawings, A represents the main frame of the machine, which may have any suitable length and width and is of convenient working height, and a power-driven shaft B is supported centrally lengthwise within said frame A in suitable bearings in cross pieces or supports $b$. Upon this shaft I preferably provide differential pulley 2 for a drive-belt, so as to work with whatever speed I may desire, and upon the ends of the shaft B outside the transverse supports $b$, as shown here, I fix disks or wheels D.

C represents a carriage which has tubular bearings $c$ on its bottom adapted to slide on the fixed transverse rods or bars F, supported on standards or arms 3 from opposite sides on frame A and above the top of the same relatively, as shown. The said bearings are of a suitable length to cause them to slide freely and directly or in a straight line upon said rods or bars F and prevent cramping, and while said bearings are shown in this instance as tubular and the rods F as round they may have any other corresponding cross-sectional pattern and serve my purpose as well, provided they afforded a free sliding movement of the carriage C and hold the same freely to a direct transverse movement back and forth without swinging the carriage in its bearings, and thus causing irregularity in its operations. It is of the highest importance in this work to have the material cross-cut with uniformity and exactness.

G represents two slotted rocking levers having their fulcrum or pivot-points at their lower ends $g$ and provided each with a lengthwise slot 6, in which is engaged a feather 4, itself loosely supported eccentrically upon the face of disk D by a screw or pin 8, on which it is freely rotatable to adapt it to the movements of the bar. There is one such bar at each end of shaft B and wheel D, and they vibrate in unison and uniformly back and forth. Their upper ends are connected by links 5 with the respective bearings or sleeves $c$ on the carrier C, and the said links while making position connections adapt bars G to an up-and-down play in respect to carrier-frame C as they swing across their pivot-points to one side and the other. It follows that when shaft B and wheels D are revolved the eccentric location of the sliding feathers 4, running in slots 6 in said bars G, will cause the carrier C to be moved to and fro across main frame A, and in its travel it traverses circular saw, so that whatever article may be placed upon the carrier to be sawed it will be cut in two in the manner and for purpose desired. Saw S is supported on an arbor 9, carrying a sheave or pulley to apply power, and a table 12 over these parts receives the cuttings from the saw. An adjustable gage 12' is shown, by which the lengths to be cut are determined. The throw of the carriage laterally is determined by the up-and-down adjustment of cross supports or bars $b$, which carry shaft B and which are fixed at their ends by screws 13 through slots 14 in the main frame. The carriage is also adjustable up and down within limits by slots 15 and screws 16 for engaging arms or brackets 3, which support cross-rods F. This adjustment is for the purpose of leveling up carriage C.

In the use of this machine I arrange to cut up stock of considerable length—say as high as twenty feet—and the product must be perfectly true to make the packages for which it is intended. I have, therefore, to be prepared to meet all conditions where a machine may be placed to work, and leveling means are required which are independent and reliable and can be used regardless of conditions and to meet the same as may occur. Hence the slotted and screw connections 15 and 16, respectively.

Any equivalent or eccentric or crank construction can be substituted for the special construction of disk D here shown.

Rollers R serve to make easy the feed of lumber on carrier C.

What I claim is—

1. The main frame and the carriage thereon, transverse guideways on the frame on which the carriage is slidably supported, separate arms supporting the four several ends of said guideways and means to adjust each of said arms independently of the others, whereby the said carriage is horizontally leveled, in combination with slotted levers pivoted at their lower ends, separate sliding bearings on each guideway connected with the said carriage front and rear, respectively, and a set of oppositely-disposed links connected with the upper ends of said levers and with said sliding bearings, substantially as described.

2. The main frame and the laterally-slidable carriage thereon and a vertically-disposed saw at one end of said carriage, in combination with a set of pivoted levers operatively connected with the ends of said carriage, a power-driven shaft, cross-pieces $b$ adjustably supported on the main frame and provided with bearings for said shaft, and eccentric connections at the ends of said shaft with the said pivoted levers, whereby the lateral travel of the carriage can be regulated and the said carriage is operated, substantially as described.

Witness my hand to the foregoing specification this 28th day of March, 1903.

GEORGE KUNDMUELLER.

Witnesses:
R. B. MOSER,
R. ZBORINK.